United States Patent [19]
Allen et al.

[11] Patent Number: 4,752,923
[45] Date of Patent: Jun. 21, 1988

[54] OPTIMAL FRAME ARRANGEMENT FOR MULTIPLEXING A PLURALITY OF SUBCHANNELS ONTO A FIXED RATE CHANNEL

[75] Inventors: Daniel L. Allen, Toms River; Stephen M. Walters, Holmdel, both of N.J.

[73] Assignee: Bell Communications Research, Inc., Livingston, N.J.

[21] Appl. No.: 946,490

[22] Filed: Dec. 24, 1986

[51] Int. Cl.$^4$ .................................... H04J 3/22
[52] U.S. Cl. ............................ 370/84; 370/99/110.1
[58] Field of Search ................ 370/84, 99, 110.1, 111

[56] References Cited

U.S. PATENT DOCUMENTS 4,617,658 10/1986 Walters .................................. 370/84
4,646,290 2/1987 Hills ..................................... 370/84

*Primary Examiner*—Douglas W. Olms
*Assistant Examiner*—Melvin Marcelo
*Attorney, Agent, or Firm*—James W. Falk; Stephen M. Gurey

[57] ABSTRACT

In order to multiplex a plurality of various rate subchannels onto a fixed rate channel, a frame structure is defined consisting of j tuples of bits. Some of the tuples are i bits long and some are less than i, the sum of the bits less than i in these tuples being equal to k where k is greater than or equal to zero. The total number of bits per frame is thus equal to ij-k where i, j and k are mathematically determined as a function of the rates of the subchannels and the rate of the fixed channel. In one tuple of i bits in each frame, all bits are set ZERO. In each other tuple, the last bit is set ONE. Framing is detected by monitoring for a ONE followed by i ZEROes a pattern which cannot occur elsewhere in the frame regardless of the data. This frame arrangement can yield shorter frames than the frame structure disclosed in U.S. Pat. No. 4,617,658, thus decreasing reframe time.

5 Claims, 6 Drawing Sheets

OPTIMAL FRAME ARRANGEMENT FOR MULTIPLEXING A PLURALITY OF SUBCHANNELS ONTO A FIXED RATE CHANNEL

BACKGROUND OF THE INVENTION

This invention relates to multiplexing a plurality of various rate subchannels onto a fixed rate channel and more particularly to defining an optimal frame structure that accomplishes this.

U.S. Pat. No. 4,617,658 issued Oct. 14, 1986 to Stephen M. Walters, co-inventor herein, and which is incorporated herein by reference, describes a framing structrure that enables a plurality of various rate subchannels to be multiplexed onto a fixed rate channel. As described therein, the frame structure consists of j sets of i-tuples for a total of ij bits per frame, wherein the parameters i and j are mathematically determined as a function of the rates of the various subchannels and the rate of the fixed channel. For $j-1$ of the i-tuples, $i-1$ bits are used for information and one bit at either end is set ONE (or ZERO). In one of the i-tuples, all i bits are set ZERO (or ONE). In the $(i-1)(j-1)$ information bit positions per frame, an integer number of information bits are distributed so that the required rate for each subchannel is provided. Maintaining proper framing of a data stream consisting of successive of these frames is readily achieved by monitoring the data stream for i successive ZEROes (or ONEs) followed or proceeded by a ONE (or ZERO), which can only occur in the data stream at the i-tuple which is set all ZERO (or ONE) per frame regardless of the data pattern of the bits in the information slots. Advantageously, framing can be detected with simple and inexpensive hardware and reframing following an out-of-frame condition can be achieved in only one frame.

By employing the techniques described in the aforenoted patent, parameters i and j can always be found for any combination of subchannel rates and fixed channel rate as long as the sum of all the subchannel rates is strictly less than the rate of the fixed channel and the fixed channel rate and the subchannel rates can be expressed as rational numbers. The resultant frame, however, consisting of ij bits, may not in all cases be the frame having the fewest number of bits achievable which uses the framing marker of i ZEROes (or ONEs) proceeded or followed by a ONE (or ZERO), and also has sufficient information slots for an integer number of bits from each subchannel to maintain the subchannel rates. Since reframe time following an out-of-frame condition is directly dependent upon frame length, minimization of frame length is desirable.

SUMMARY OF THE INVENTION

In accordance with the present invention, an optimal frame size, i.e. minimum length, can be found for multiplexing a plurality of various rate subchannels onto a fixed rate channel by adding an additional degree of freedom to the frame consisting of j i-tuples. In particular, k bits are deleted from arbitrarily chosen information bit positions, i.e. non-framing bits, so that the total number of bits in the "rectangular" frame is ij-k, where all the parameters, i, j, k and ij-k are mathematically determined as a function of the rates of the subchannels and the rate of the fixed channel. Framing is maintained by setting in each frame all the bits in one i-tuple to ZERO (or ONE) and setting in the other tuples of length i or less one bit at a fixed end to ONE (or ZERO). Framing can thus still be detected by monitoring for i successive ZEROes (or ONES) followed or proceeded by a ONE (or ZERO), which cannot occur elsewhere in the frame regardless of the data pattern.

DETAILED DESCRIPTION

Figure 1:
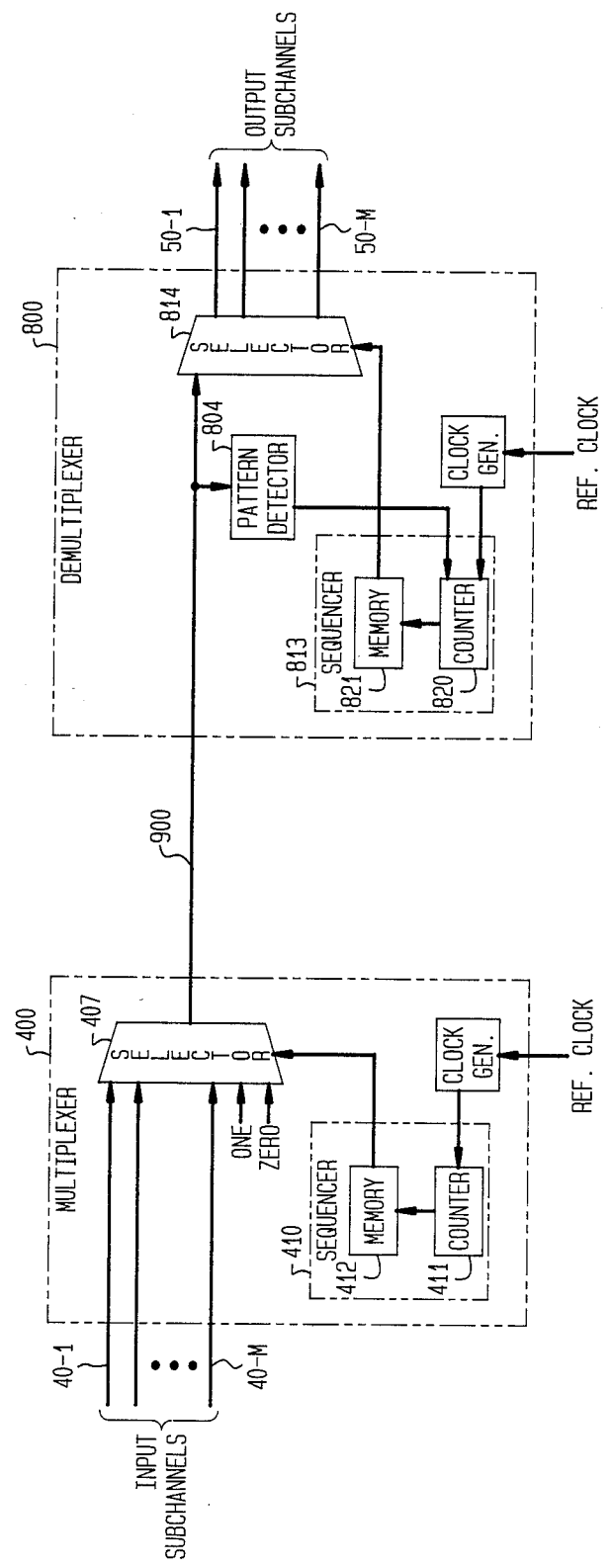
FIG. 1 is a block diagram of a multiplexer and demultiplexer in a transmission system which forms the frames of bits from the input subchannels in accordance with the frame arrangement of the present invention.

With reference to FIG. 1, a transmission system is shown which includes a multiplexer 400 and demultiplexer 800 interconnected by transmission line 900. For a specific set of subchannel rates, r(1), . . . ,r(M), on input subchannels 40-1, . . . ,40-M, and a fixed transmission rate R on transmission line 900, a specific frame configuration is determined in accordance with the present invention. This frame consisting of ij-k bits, where i, j and k are determined from the sets of subchannel rates {r(/l)} and the fixed channel rate R, is successively formed by multiplexer 400 which selects bits from the input subchannels 40-1, . . . ,40-M and from fixed framing ONE and ZERO bits as per a stored frame assignment pattern. Demultiplexer 800 at the receiving end of transmission. line 900 examines the incoming bit stream for the specific framing pattern to locate the start of the frame and then distributes the bits within the received frame to the appropriate output subchannels 50-1, . . . ,50-M in accordance with a stored predetermined arrangement of bits within the frame.

As will be described hereinafter, the multiplexer shown in FIG. 4 and the demultiplexer shown in FIG. 8 of the aforenoted patent can be incorporated as the multiplexer 400 and demultiplexer 800, respectively, in the present transmission system.

In order to define the frame parameters of the present invention, the mathematics of configuring a frame structure for multiplexing a plurality of subchannels in general will be presented prior to presenting the mathematical evolution to the frame structure of the present invention from the prior art framing structure disclosed in the aforenoted patent.

As described in the aforenoted patent, certain necessary conditions must be specified in order to define a frame structure that is capable of multiplexing a plurality of subchannels. In particular if a channel operating at a fixed rate of R bits per second is to be divided into M subchannels, where the rate of each subchannel l is r(l), $1 \leq l \leq M$, then a necessary condition is that:

$$\sum_{l=1}^{M} r(l) < R \qquad (1)$$

to permit some bits to be allocated for framing purposes.

Since each frame must simultaneously contain an integer number of total bits and contain an integer number of bits assigned to each channel, certain rules of allowable frame sizes can be determined. On the average, each subchannel l requires r(l) out of every R bits carried on the fixed rate channel. The portion of channel capacity thus consumed by each subchannel is given by:

$$\frac{r(l)}{R} \quad l = 1, 2, \ldots, M \qquad (2)$$

Since R and r(l) are both rational, this ratio can be expressed as:

$$\frac{r(l)}{R} = \frac{u(l)}{q(l)} \quad l = 1, 2, \ldots, M \qquad (3)$$

The least common multiple of the denominators, q(l), is denoted by Q:

$$Q = \text{LCM}\{q(l), l = 1, 2, \ldots, M\} \qquad (4)$$

Frame sizes of Q bits (or an integer multiple of Q bits, xQ) are the only possible frame sizes for which the products of the frame rate (R/xQ frames per second) times the number of subchannel bits per frame exactly produce the subchannel bit rates, r(l). Given R and {r(l)}, finding the minimal frame length translates into finding the smallest x such that the frame length xQ provides enough bits (in addition to bits required by all subchannels) for including a framing code in the frame.

Having found Q, the demands of each subchannel on the channel capacity is expressed from equation (3) as:

$$\frac{r(l)}{R} = \frac{p(l)}{Q} \quad l = 1, 2, \ldots, M \qquad (5)$$

$$\frac{r(l)}{R} = \frac{xp(l)}{xQ} \quad l = 1, 2, \ldots, M \qquad (6)$$

or
where x is a positive integer. Equation (6) states that out of every xQ bits in a frame, channel l is assigned xp(l) bits. The total utilization of the fixed rate channel by all M subchannels can be expressed in terms of normalized bit rates or bits per frame. Summing the terms of equation (6) gives $$\frac{\sum_{l=1}^{M} r(l)}{R} = \frac{\sum_{l=1}^{M} xp(l)}{xQ} = \frac{xP}{xQ} \qquad (7)$$

Therefore, given the rates (R, {r(l)}), the frame must contain xQ bits, of which each subchannel l is assigned xp(l) bits. Of the xQ bits per frame, xP bits are assigned to the M subchannels, and x(Q−P) bits are available for framing bits.

The discussion hereinabove is relative to any scheme used to multiplex a plurality of subchannels having rates {r(l)} onto a fixed rate channel having a rate R. For purposes of clarity, the discussion that follows will first review the framing structure which is the subject of the aforenoted patent. The framing structure of the present invention will be described thereinafter.

Figure 2:
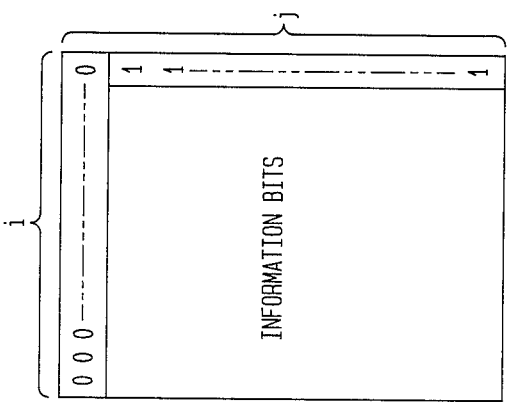
FIG. 2 is an illustration of the prior art frame organization containing j i-tuples of which $(i-1)(j-1)$ bits are information bits.

FIG. 2 shows the prior art framing structure which consists of j i-tuples of bits. For framing, all bits in the first i-tuple are set ZERO and all bits in the last bit position of each of the other j−1 i-tuples are set ONE. The framing pattern of a ONE followed by i ZEROes can only occur once in the frame making pattern detection easy.

The total number of bits in the frame is given by:

$$ij = xQ \qquad (8)$$

Since the frame must have sufficient bit positions to hold the required number of subchannel and framing bits the following inequality must be met:

$$(i-1)(j-1) \geq xP \qquad (9)$$

In the aforenoted patent, an algorithm is presented for determining from the rates {r(l)} of the subchannels and the rate R of the fixed channel, sets of parameters i and j that are allowable.

The sets of solutions determined from equation (8) and inequality (9) can be geometrically interpreted. This geometric analysis will provide background for determining the frame parameters of the current invention which produces frames having minimal frame lengths.

Equation (8) can be written as:

$$j = \frac{xQ}{i} \qquad (10)$$

By multiplying the terms in inequality (9) and substituting xQ for the ij product term, inequality (9) can be written as:

$$j \leq -i + 1 + x(Q-P) \qquad (11)$$

Figure 3:
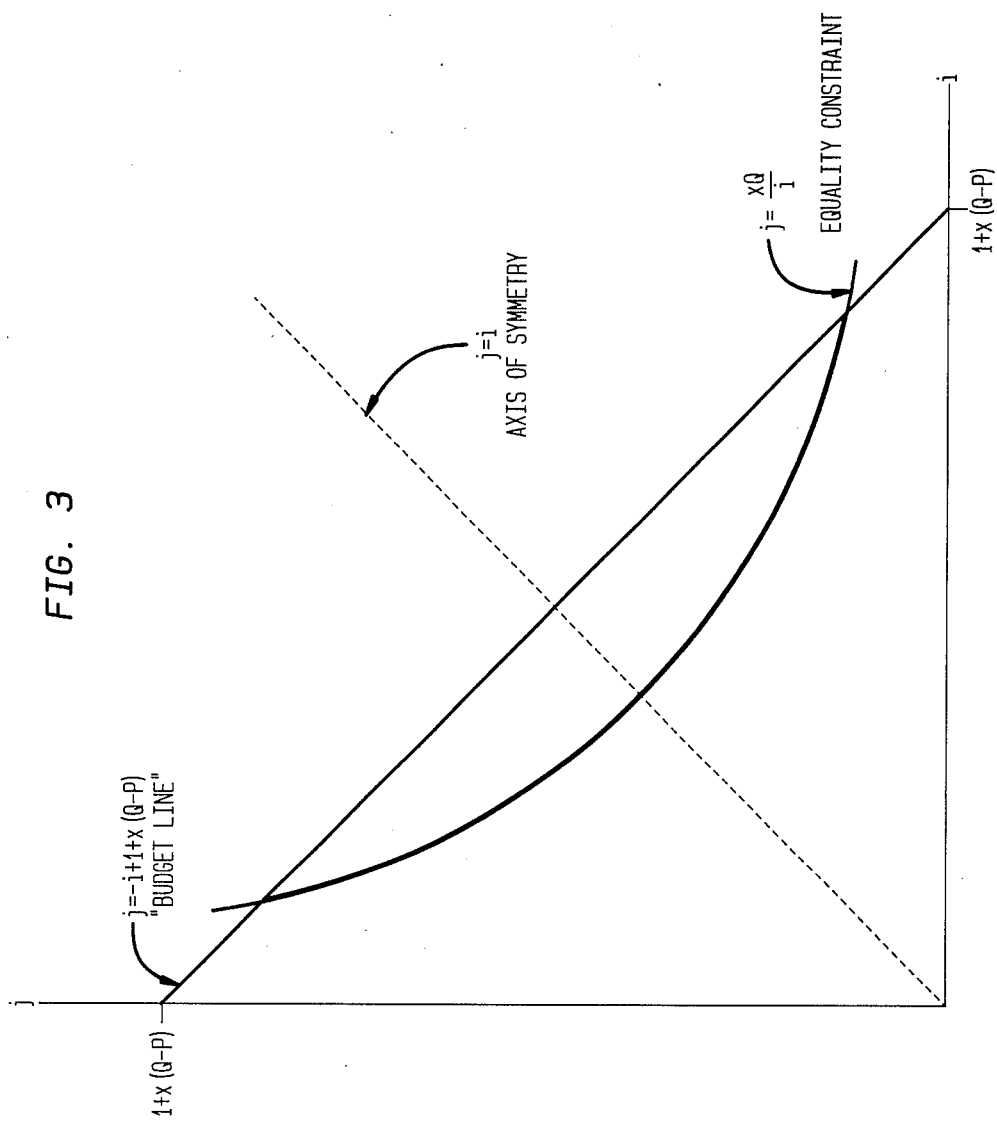
FIG. 3 shows a graphical interpretation on an (i,j) plane of the parameters for the frame structure of FIG. 2.

FIG. 3 shows the hyperbola defined by equation (10) and the straight line that bounds values of i and j from inequality (11). The hyperbola passes through all i,j integer pairs, if any, whose product produces the required frame length, xQ for a given x. The line that bounds values of i and j can be interpreted by rewriting inequality (11) as:

$$i + j - 1 \leq x(Q - P) \qquad (12)$$

and noting that the frame contains exactly i+j−1 framing bits which must be equal to or fewer than the number of bits available for framing, x(Q−P). Thus, the bound on i and j can be thought of as a "budget line." Any frame constructed of j i-tuples where i and j are on or below the line is guaranteed to have sufficient bit positions "budgeted" for the i+j−1 framing bits.

The "segment of interest" of the hyperbola that will produce solutions must, therefore, lie below the line and at least one i,j pair on this segment must be an integer pair or no frame arrangement is possible for this size frame. Thus, another value of x must be tested.

For fixed values of P and Q, there is a minimum value for x such that values of x below this minimum produces no segment of interest at all. This is equivalent to saying that for too-small values of x, sufficient framing bits can not fit into a frame of length xQ. This minimum value of x is found by equating the right-hand sides of equations

(10) and (11) to get the endpoints of the segment of interest and then solving for the value of x that yields coincident endpoints. This procedure eliminates j as a variable and yields the following for segment-of-interest endpoints in terms of i:

$$i_{1,2} = \frac{1 + x(Q-P)}{2} \pm \left[\left(\frac{1+x(Q-P)}{2}\right)^2 - xQ\right]^{\frac{1}{2}} \quad (13)$$

The value of x that gives a single point of interest (zero value for the square root term) is:

$$x = \left(\frac{1}{\sqrt{Q} - \sqrt{P}}\right)^2 \quad (14)$$

Since x must be an integer, x must equal or exceed its value in equation (14), or $$x \geq \left[\left(\frac{1}{\sqrt{Q} - \sqrt{P}}\right)^2\right] \quad (15)$$

where [z] denotes the smallest integer greater than or equal to z.

FIG. 3 shows the curve and the budget line that constrain the frame structure. As aforenoted, acceptable value for i and j lie on the segment of the hyperbola that extends below the budget line. If the segment passes through no integer pairs (i,j) the candidate frame size xQ is disqualified and a larger frame must be tested.

Figure 5:
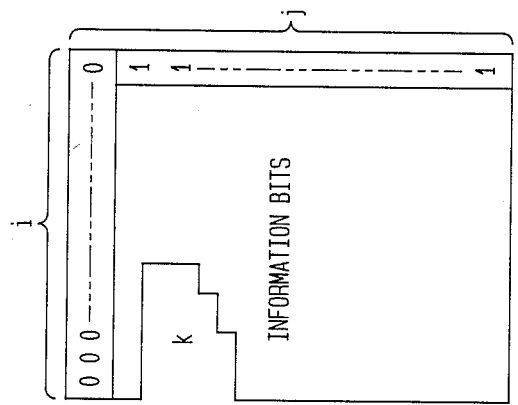
FIG. 5 is an illustration of the frame organization of the present invention consisting of ij-k bits of which $(i-1)(j-1)$-k bits are information bits.

In order to minimize reframe time following an out-of-frame detected condition it is desirable to use a frame size as small as possible. In accordance with the present invention, the smallest possible frame size is realized by taking advantage of integer pairs that can be captured above the hyperbola and on or below the budget line without sacrificing within the frame the advantages of a framing sequence consisting of a ONE followed by i ZEROes. As noted in FIG. 4, several points may lie within this "region of interest". All of these points produce frames that are longer than xQ and have sufficient space for the required framing bits. In accordance with the invention herein, too-long frames are shortened by shortening one or more i-tuples to bring the total number of bits per frame down to xQ. FIG. 5 shows the frame configuration of the present invention where k bits are deleted from arbitrarily chosen i-tuples without deleting any framing bits. These shorter-than-i tuples therefore also end with a fixed ONE.

The constraints on the rectangular prior art frame structure given by equations (8) and (9) must now account for the new degree of freedom. The constraint that frame sizes must be an integer multiple of Q is now given by:

$$ij - k = \chi Q \quad (16)$$

The constraint that the frame have sufficient bits to hold the required number of subchannel and framing bits is given by:

$$(i-1)(j-1) - k \geq \chi P \quad (17)$$

The two constraints produce a set of hyperbolic equality constraints and a "budget line" inequality constraint. Solving equation (16) for j yields:

$$j = \frac{xQ + k}{i} \quad (18)$$

Variation in the parameter k produces a family of equality constraints. (Any integer pair on any one of these hyperbolas produces a frame whose size is the desired integer multiple of Q. By performing the multiplication indicated in equation (17) and substituting xQ for the resulting ij-k terms yields:

$$j \leq -i + 1 + x(Q-P) \quad (19)$$

which removes any explicit dependence on k and yields the same budget line as does equation (11).

Figure 6:
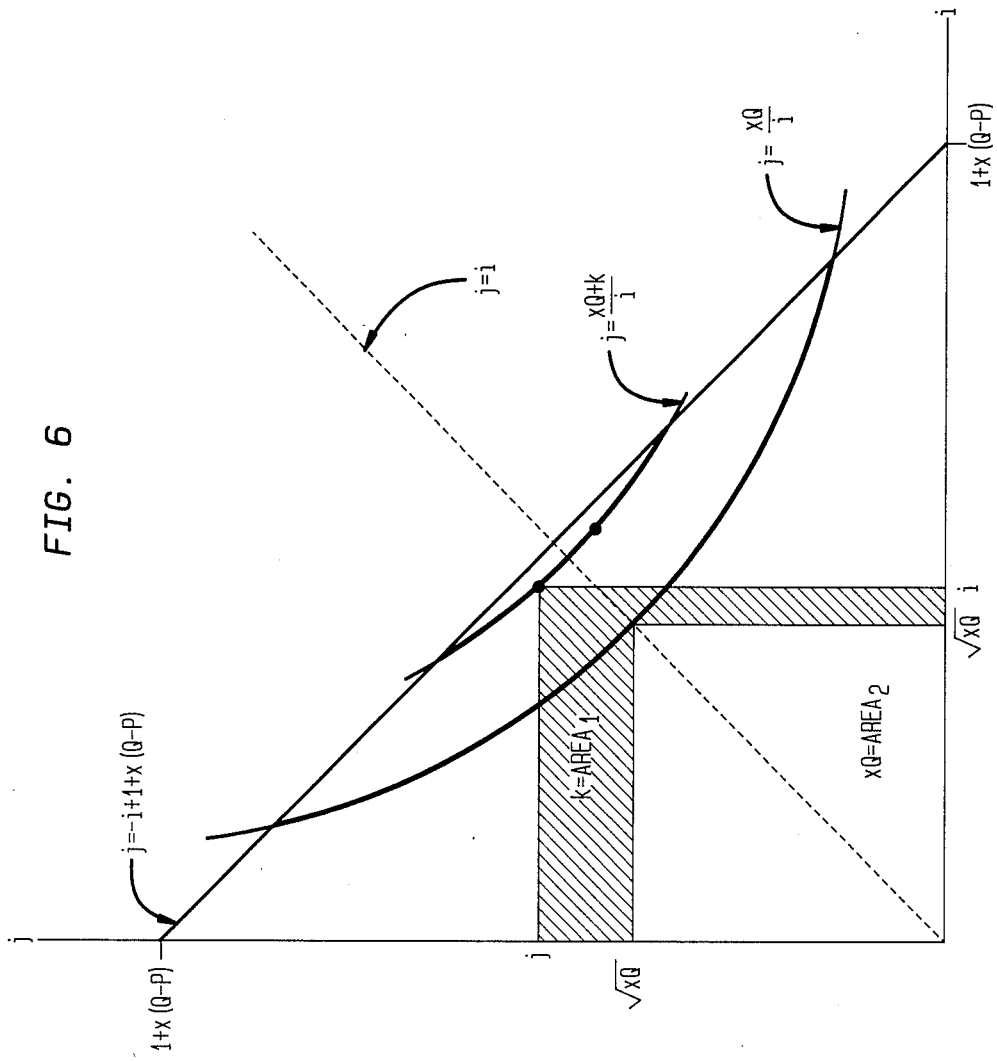
FIG. 6 shows a graphical interpretation of the frame structure of FIG. 5.

FIG. 6 shows a graphical interpretation of the frame configuration of FIG. 5. The required frame size is xQ bits which appears in the i,j plane as a rectangle under the lowest (k=0) hyperbola. The particular case shown is the square frame with $i=j=\sqrt{xQ}$ (For purposes of discussion hereinnow, $\sqrt{xQ}$ does not need to be integer-valued). Allowing k in equation (18) to assume increasing values (k=0, 1, 2, ...) generates a family of hyperbolas that intercept the budget line at points that are at decreasing distances from its midpoint, $[1+x(Q-P)]/2$. Any integer pair (i,j) captured between the lowest hyperbola (k=0) and the budget line, inclusive, will lie on one of these hyperbolas, and a frame can be constructed with integer values of i, j, and k. FIG. 6 shows that interpretaion of k as the "excess" area, Area 1, in a rectangular frame of j i-tuples. Area 2 is the required frame size, xQ. Thus, $k=ij-xQ$, and k always has an integer value since it is the difference between two integers.

Figure 7:
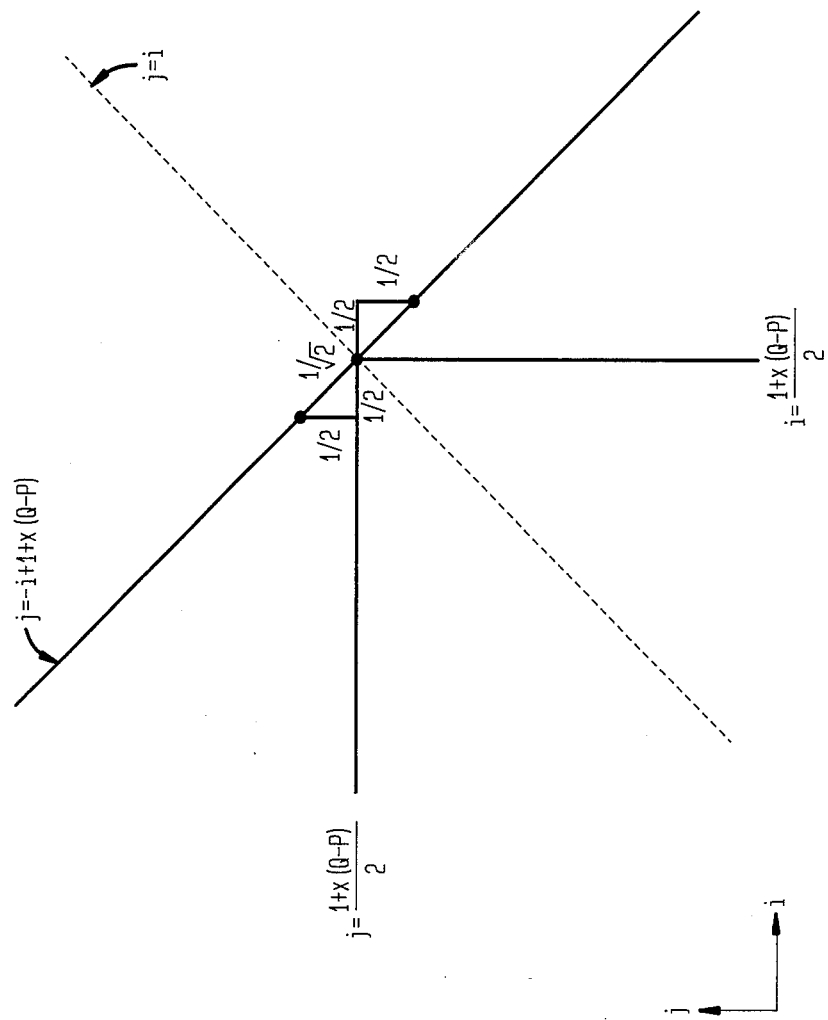
FIG. 7 shows the neighborhood in the i,j plane of guaranteed solutions for the parameters of the frame of FIG. 5.

The ability of this technique to guarantee minimal frame size is demonstrated by considering the i,j plane in the vicinity of the midpoint of the budget line. FIG. 7 shows the neighborhood of the midpoint, $i=j=[1+x(Q-P)]/2$. Given Q, P, and a candidate value of x, if any point (i,j) is captured between the hyperbola j=xQ/i and the budget line, inclusive, the midpoint of the budget line will be captured. If the product x(Q-P) is odd, the midpoint is an integer pair and is always a solution to the framing problem. Thus, if x(Q-P) is odd, x must be large enough to capture only this one point. The smallest integer value of x that captures this midpoint (or most nearly causes the square root term in equation (13) to disappear while still giving real-valued intercepts is:

$$x_{min} = \left[\left(\frac{1}{\sqrt{Q} - \sqrt{P}}\right)^2\right] \text{ for } x_{min}(Q-P) \text{ odd} \quad (20)$$

If the product x(Q−P) is even, then the midpoint of the budget line is $i=j=a+\frac{1}{2}$, where a is a positive integer. The "first" integer pairs captured with increasing x are the twin solutions that are a distance of $1/\sqrt{2}$ along the budget line on both sides of its midpoint. Therefore, if x(Q−P) is even, x must be just large enough to capture these two points: $i,j=[1+x(Q-P)]/2\pm\frac{1}{2}$. In terms of i, the two intercepts must be separated from the midpoint by at least a distance of $\frac{1}{2}$. From equation (13), the integer value of x that guarantees this spread of intercepts is:

$$x_{min} = \left[ \left( \frac{1}{\sqrt{Q} - \sqrt{P}} \right)^2 + \left( \frac{1}{\sqrt{Q} + \sqrt{P}} \right)^2 \right] \text{ for } x_{min}(Q - P) \text{ even} \quad (21)$$

Given Q and P, the evenness or oddness of the product $x_{min}(Q-P)$ cannot be known until $x_{min}$ is known. Therefore, the frame structuring algorithm described hereinbelow requires at most two iterations to identify $x_{min}$.

The algorithm for determining the optimal frame structure is given as follows:

1. Given R and $\{r(l)\}$, determine Q from equations (3) and (4) and determine P from equation (7).
2. With Q and P known, calculate $$x_0 = \left[ \left( \frac{1}{\sqrt{Q} - \sqrt{P}} \right)^2 \right] \quad (22)$$

3. Test $x_o$ (Q−P): if odd, then $x_{min}=x_o$, minimum frame size is $x_{min}Q$, and $$i = j = \frac{1 + x_{min}(Q - P)}{2} \quad (23)$$

$$k = ij - x_{min}Q \quad (24)$$

Go to step 6; else continue.
4. Calculate $$x_{min} = \left[ \left( \frac{1}{\sqrt{Q} - \sqrt{P}} \right)^2 + \left( \frac{1}{\sqrt{Q} + \sqrt{P}} \right)^2 \right] \quad (25)$$

5. Test $x_{min}(Q-P)$:
if even, then $$i,j = \frac{1 + x_{min}(Q - P)}{2} \pm \frac{1}{2} \quad (26)$$

$$k = ij - x_{min}Q \quad (27)$$

Go to step 6;
else, $$i = j = \frac{1 + x_{min}(Q - P)}{2} \quad (28)$$

$$k = ij - x_{min}Q. \quad (29)$$

6. Calculate subchannel bit assignments $(x_{min}p(l), L=1, 2, \ldots, M)$ as prescribed by equation (7).

The choice of which i-tuple(s) are shortened and by how much is arbitrary as long as the total number of bit positions deleted from all i-tuple(s) is exactly k and as long as no framing bit positions are deleted.

7. Stop

As a numerical example, assume that the fixed rate channel has a capacity R of 4000 bps and that the following four subchannels are to be multiplexed: $\{r(1)=333\frac{1}{3}$ bps, $r(2)=300$ bps, $r(3)=1800$ bps and $r(4)=1200$ bps$\}$. The aforedescribed steps can now be followed:

1. Applying equation (3) yields the following irreducible ratios:

$$\frac{r(1)}{R} = \frac{333\frac{1}{3}}{4000} = \frac{1}{12} \quad \frac{r(2)}{R} = \frac{300}{4000} = \frac{3}{40}$$

$$\frac{r(3)}{R} = \frac{1800}{4000} = \frac{9}{20} \quad \frac{r(4)}{R} = \frac{1200}{4000} = \frac{3}{10}$$

Q is the LCM of $\{12, 40, 20, 10\} = 120$. Equation (7) gives channel utilization as $$\frac{\sum_{l=1}^{4} r(l)}{R} = \frac{\sum_{l=1}^{4} xp(l)}{xQ} = \frac{x(10 + 9 + 54 + 36)}{x(120)} = \frac{x(109)}{x(120)}$$

which shows that $P=109$ and $Q-P=11$.
2. Calculate $$x_0 = \left[ \left( \frac{1}{\sqrt{120} - \sqrt{109}} \right)^2 \right] = [3.7829] = 4$$

3. Test: $x_o(Q-P)=4(11)=44=$even.
4. Calculate $$x_{min} = \left[ \left( \frac{1}{\sqrt{120} - \sqrt{109}} \right)^2 + \left( \frac{1}{\sqrt{120} + \sqrt{109}} \right)^2 \right] = [3.7851] = 4$$

5. Test: $x_{min}(Q-P)=4(11)=44=$even.
Therefore,
minimum frame size$=4=120=480$ bits $$i,j = \frac{1 + 4(11)}{2} \pm \frac{1}{2} = 22,23$$

$$k = (22)(23) - 480 = 26.$$

6. The $x_{min}P=436$ information bits in the frame are allocated to subchannels as follows:
$x_{min}p(1)=4(10)=40$ bits to subchannel 1
$x_{min}p(2)=4(9)=36$ bits to subchannel 2
$x_{min}p(3)=4(54)=216$ bits to subchannel 3
$x_{min}p(4)=(36)=144$ bits to subchannel 4

Using the procedures described in the aforenoted patent to find the parameters of the smallest rectangular (i,j) frame yields $x=5$, $xQ=600$, $i=20$ and $j=30$. The 600 bit frame is thus 25% larger than the 480 bit (i, j, k) frame obtained using the present invention. Although the procedures of the present invention to find the parameters of the optimal frame may sometimes yield the same prior art rectangular i,j frame ($k=0$), these procedures will never yield a larger frame.

Figure 4:
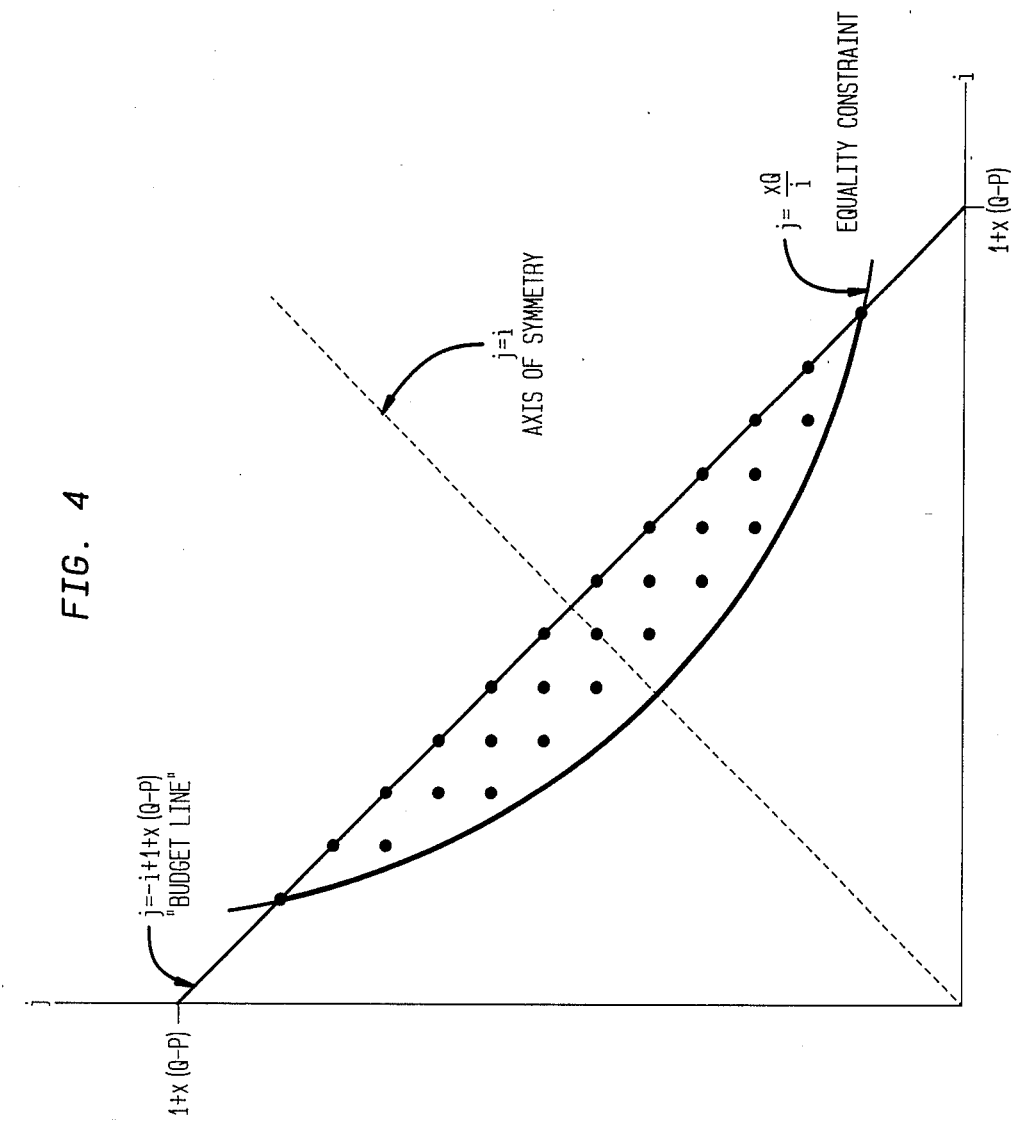
FIG. 4 shows integer pair captured within a region of interest of FIG. 3.

In the aforenoted patent, a multiplexer, shown in FIG. 4 therein, and demultiplexer, shown in FIG. 8 therein, are disclosed which multiplex and demultiplex the plural subchannels onto and off of the fixed rate channel, respectively, in accordance with the framing scheme that consists of j i-tuples. For a given set of subchannel rates $\{r(l)\}$ and a given fixed channel rate R, a specific (i,j) frame is configured in which each bit in the first i-tuple is set ZERO and the last bit in each other i-tuple is set ONE. In the other $(i-1)(j-1)$ bit positions, bits slots are assigned to the various subchannels. The multiplexer forms each frame by selecting for transmission either a bit from a particular subchannel or a pre-set framing ONE or ZERO bit depending upon the position of the bit within the frame.

As aforenoted, the multiplexer of FIG. 4 and the demultiplexer of FIG. 8 of the aforenoted patent can be incorporated into the transmission system of FIG. 1 herein, which transmits successive frames arranged in accordance with the present invention. With reference to FIG. 1 herein, only those structural elements of multiplexer 400 and demultiplexer 800 are shown which are relevant to the present description. The functioning of multiplexer 400 and demultiplexer 800 in accordance with the present invention is readily apparent to one skilled in the art from the disclosure in the aforenoted patent.

Multiplexer 400 includes a sequencer 410 which contains a counter 411 and a memory 412. Counter 411 counts bits and depending on the count, selects for output on transmission line 900, a bit from one of the subchannels 40-1, . . . , 40-M, or a framing ONE or ZERO. This selection process is controlled by memory 412 which has stored therein the frame structure of an ij-k frame configured in accordance with the present invention. Thus each bit position within the frame is assigned to a specific subchannel or a framing ONE or ZERO. Multiplexer 400 functions identically to the multiplexer in FIG. 4 of the aforenoted patent with the exception being that the memory has stored within the bit assignments for an i, j, k frame configuration in accordance with the present invention, rather than the bit assignments for an i, j frame.

Demultiplexer 800 includes a sequencer 813 containing a counter 820 and memory 821. A pattern detector 804 scans the input bit stream for a ONE followed by i ZEROes to indicate the start of the frame. Thereupon counter 820 counts each bit and depending upon the count and the frame configuration stored in memory 821, distributes the received bits to the appropriate output subchannel 50-1, . . . ,50-M or identifies the bit as a framing bit. Demultiplexer 800 thus also functions identically to the demultiplexer in FIG. 8 of the aforenoted patent with the exception being that the bit assignment pattern of a frame configured in accordance with the i, j, k frame of the present invention is stored in memory 821.

Whereas the apparatus described in the aforenoted patent multiplexes and demultiplexes one particular mix of subchannel rates onto a fixed bit rate channel, an adaptive rate multiplexer/demultiplexer that adapts itself to any combination of subchannel and fixed channel rates is described in U.S. application Ser. No. 804,689, filed Dec. 4, 1985, by Stephen M. Walters, co-inventor herein, which is now U.S. Pat. No. 4,658,152 issued Apr. 14, 1987, and which is also incorporated herein by reference. By changing the bit assignment pattern of the frame structure stored in memory 204 of that structure, the apparatus automatically adapts to the subchannel bit rates. This same apparatus will also automatically adapt itself to a stored frame bit assignment pattern that has been configured in accordance with the present invention.

The above described embodiment is illustrative of the principles of the present invention. Other embodiments may be devised by those skilled in the art without departing from the spirit and scope of the present invention.

What is claimed is:

1. A method for multiplexing a plurality of digital subchannels onto a fixed rate digital channel by forming successive frames of bits comprising the steps of:
   forming said frames so that each frame consists of ij-k bits, i, j and k being mathematically determined as a function of the rates of each of said digital subchannels and the rate of said fixed rate digital channel, each frame consisting of j tuples of bits, a predetermined number of said tuples having i bits and each of the other of said tuples having less than i bits by selected numbers, the sum of said selected numbers being k, where k is greater than zero,
   setting in each frame each bit in one of said j tuples of i bits to one predetermined binary digit,
   setting in each frame one fixed bit at one end of each of the other j−1 tuples to a predetermined binary digit opposite to the digit set as each bit of said one tuple of i bits, and
   distributing in each frame in a predetermined pattern in the remaining (i−1)(j−1)-k bit positions an integral number of bits from each of said subchannels.

2. The method in accordance with claim 1 wherein the frame length ij-k equals xQ where x is an integer and Q is the least common multiple of the denominators of the subchannel rates normalized by the fixed channel rate to an irreducible ratio.

3. In a multiplexer that multiplexes a plurality of digital subchannels onto a fixed rate digital subchannel by forming successive frames having a fixed number of bits framing apparatus that comprises:
   means for forming each frame so that it contains j tuples of bits, a predetermined number of said tuples having i bits and each of the other of said tuples having less than i bits by selected numbers, the sum of said selected numbers being k where k is greater than zero, i, j and k being mathematically predetermined as a function of the rates of each of said digital subchannels and the rate of said fixed rate digital channel,
   said forming means including means for setting in each frame in one of said tuples of i bits to one predetermined binary digit, means for setting in each frame one fixed bit at one end of each of the other j−1 tuples to a predetermined binary digit opposite to the digit set as each bit of said one i-tuple, and means for distributing in each frame in a predetermined pattern in the remaining (i−1)(j−1)-k bit positions an integral number of bits from each of said subchannels.

4. Framing apparatus in accordance with claim 3 wherein the frame length ij-k equals xQ where x is an integer and Q is the least common multiple of the denominators of the subchannel rates normalized by the fixed channel rate to an irreducible ratio.

5. A digital transmission system for transmitting a plurality of input bit streams on a plurality of digital input subchannels over a fixed rate digital channel by multiplexing at one end of said system said input bit streams to form a multiplexed bit stream and at the other end of said system demultiplexing said multiplexed bit stream to reform said input bit stream on a plurality of output subchannels comprising:
   at said one end, means for forming from said plurality of digital subchannels successive frames having a fixed number of bits, each of said frames consisting of j tuples of bits, a predetermined number of said tuples having i bits and each of the other said tuples having less than i bits by selected numbers, the sum of said selected numbers being k where k is greater than zero, i, j, and k being mathematically predetermined as a function of the rates of each of said digital input subchannels and the rate of said fixed rate digital channel, in one of said tuples of i bits in each frame each bit being set to one predetermined binary digit, and in each of the other $j-1$ tuples in each frame one fixed bit at one end of the tuple being set to the opposite binary digit, and an integral number of bits from each of said digital input subchannels being distributed in a predetermined pattern among the remaining $(i-1)(j-1)$-k bit positions in each frame, and at the other end, means for determining the start of each frame by detecting in $i+1$ consecutive bits in the multiplexed bit stream i consecutive bits that are said one predetermined binary digit and one bit that is said opposite binary digit, and means for distributing from each frame in a predetermined pattern the bits in said $(i-1)(j-1)$-k bit positions to said output subchannels.

* * * * *

UNITED STATES PATENT AND TRADEMARK OFFICE
CERTIFICATE OF CORRECTION

PATENT NO. : 4,752,923

DATED : June 21, 1988

INVENTOR(S) : Daniel L. Allen, Stephen M. Walters

It is certified that error appears in the above-identified patent and that said Letters Patent is hereby corrected as shown below:

Column 3, line 26, change " $\{q(\iota), \iota=1,2$" to -- $\{q(l), l=1,2$--.

line 44, after equation (5) add --or-- line 47, delete "or".

Column 4, line 12, change "ij=$\chi^Q$ " to --ij=x$Q$--.

Column 4, line 18, change "$\chi P$ " to --xP--.
Column 4, line 39, change "$\chi(Q-P)$" to --x(Q-P)--.
Column 5, line 61, change "$\chi^Q$ " to --xQ--.

Column 5, line 66, change "$\chi^P$ " to --xP--.

Column 6, line 15, change "$\chi(Q-P)$"to --x(Q-P)--.

Signed and Sealed this

Eighth Day of January, 1991

*Attest:*

HARRY F. MANBECK, JR.

*Attesting Officer*  *Commissioner of Patents and Trademarks*